(12) United States Patent
Shlomo et al.

(10) Patent No.: US 8,468,225 B2
(45) Date of Patent: Jun. 18, 2013

(54) ROAMING TCP CONNECTIONS BETWEEN CHANGING PHYSICAL NETWORKS

(75) Inventors: Oz Shlomo, Kfar Saba (IL); Eyal Toledano, Kiryat Ata (IL); Choi Hyok-Sung, Seoul (KR); Shin Seong-Kook, Suwon (KR); Hyun Lyunsik, Seoul (KR); Seol Ji Hun, KyungKi-Do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 141 days.

(21) Appl. No.: 12/969,735

(22) Filed: Dec. 16, 2010

(65) Prior Publication Data

US 2012/0158929 A1  Jun. 21, 2012

(51) Int. Cl.
*G06F 15/177* (2006.01)

(52) U.S. Cl.
USPC .......................................... 709/222; 709/220

(58) Field of Classification Search
USPC ................ 709/220, 222; 370/331, 338; 455/3
See application file for complete search history.

(56) References Cited

U.S. PATENT DOCUMENTS

| | | | |
|---|---|---|---|
| 6,091,951 A | 7/2000 | Sturniolo | |
| 7,356,013 B2 * | 4/2008 | Linder et al. | 370/338 |
| 7,596,120 B2 | 9/2009 | Kim | |
| 7,969,946 B2 * | 6/2011 | Zhu et al. | 370/331 |
| 2004/0176023 A1 * | 9/2004 | Linder et al. | 455/3.01 |
| 2007/0165572 A1 * | 7/2007 | Lenzarini | 370/331 |
| 2007/0204049 A1 | 8/2007 | Herrod | |
| 2008/0225795 A1 * | 9/2008 | Sun et al. | 370/331 |
| 2009/0268661 A1 | 10/2009 | Ng | |

OTHER PUBLICATIONS

Corbet, TCP window scaling and broken routers, Jul. 7, 2004, Linux Weekly News.*
T. Socolofsky et al, A TCP/IP Tutorial, Jan. 1991, Internet Engineering Task Force.*
Gong Su et al, Mobile Communication wuth Virtual Network Address Translation, Feb. 2002, Columbia University.*
Xun Qu et al, a Mobile TCP Socket, The Australian National University.*
Su et al. Mobile Communication with Virtual Network Address Translation, Feb. 2002.*
Su et al., Mobile Communication with Virtual Network Address Translation, Feb. 2002, Technical Report CUCS-003-02, Columbia University.*
xp 002286437 mobile communications with virtual network address translation; Feb. 2002.
XP 002478055, A mobile TCP socket; Apr. 23, 2008.
XP 010258704, TCP mobility support for continuous operation, Oct. 28, 1997.
European search report for application No. 11193860.1-1525, Mar. 27, 2012, 7 pages.
http://publib.boulder.ibm.com/infocenter/lmc/v6r1/index. jsp?topic=icom.ibm.lmc.doc/wcwin27.htm, as printed on Dec. 16, 2010—3 pages—according to source code, this document has a 2000, 2004 copyright claim.

(Continued)

*Primary Examiner* — Hassan Phillips
*Assistant Examiner* — Luna Weissberger
(74) *Attorney, Agent, or Firm* — Roach Brown McCarthy & Gruber, P.C.; Kevin D. McCarthy

(57) ABSTRACT

A system for roaming TCP connections when the physical networks are changed, comprising a Virtual Network Interface Card (NIC) having a unique IP address.

12 Claims, 4 Drawing Sheets

OTHER PUBLICATIONS

"A simple implementation to roaming between GPRS and WiFi Networks1" by M. Adda, J. Saunders and A. Peart, of Portsmouth, Portsmouth. 7 pages—(2004—according to M. Adda's resume at http://userweb.port.ac.uk/~addam/publications.html).

"Freeze-TCP: A true end-to-end TCP enhancementmechanism for mobile environments" Tom GoffJames MoronskiD. S. Phatak, 9 pages—2000.

* cited by examiner

ROAMING TCP CONNECTIONS BETWEEN CHANGING PHYSICAL NETWORKS

FIELD OF THE INVENTION

The present invention relates to the field of wireless communication. More particularly, the invention relates to a method and system for the seamless roaming between networks.

BACKGROUND OF THE INVENTION

Today's mobile devices are able to communicate using a plurality of network infrastructures. For example, a laptop may connect to a wired network, a WiFi Access Point, a Bluetooth device or tethering to an external device, such as a mobile phone, to connect to a cellular network. (3G, GPRS etc.)

In wireless telecommunications, roaming is a general term referring to the extension of connectivity service in a location that is different from the home location where the service was registered. Roaming services exist in wireless networks allowing the user to seamlessly continue data transfer while changing networks. Normally roaming applies to the same network while connecting to different Access Point or Base Station. Effectively only the physical route is updated but the IP address remains unchanged. Attempts have been made in the art (e.g., in U.S. Pat. No. 6,091,951) to address these issues, although no efficient solution has been provided to date.

The existing roaming services provide the user with apparent continuous network connectivity while the network infrastructure provides seamless roaming services. Thus, for example, a mobile phone call remains connected while the user is changing location and hence changing the radio network. However, the existing roaming solutions are bound to their underlying infrastructure. For example, a 3G network provides seamless data roaming service while the device migrates between cells. But it is unable to provide the seamless roaming service when the device disconnects from the 3G network and connects to a WiFi access point. In such cases the existing connections are broken and have to be reestablished.

A TCP connection is represented by a 4-tuple (source IP, source Port, destination IP, destination port). The source IP address may be assigned statically or dynamically. Connecting to different networks changes the source IP address. For example, a mobile phone may have an IP address that was assigned to it by the mobile operator network. Should the mobile phone connect to a WiFi Access Point it will acquire a new IP address, assigned by the Wireless Access Point device. When a device changes its source IP address, local TCP connections need to be reestablished since the existing 4-tuple no longer identifies the current connection.

Broken connections can either be implicitly handled by the running applications or explicitly handled by the user. In some cases reestablishing a broken connection requires the user to restart the existing application.

Modern roaming systems that are known in the art provide an inter-network roaming service, which uses an abstraction to the physical network layer. Thus, all network traffic is first directed to the abstract layer which, in turn, transmits the data using the available physical network.

US Patent Application No. 2007/0204049 discusses a method for maintaining connectivity between applications when the existing connection is impaired. The suggested method introduces a virtual socket software module that must be used by applications requiring maintaining connectivity. However, it does not provide a solution to networked applications that were not developed using the suggested software module.

IBM Lotus Mobile Connect application provides a cross-network roaming option (http://publib.boulder.ibm.com/infocenter/lmc/v6r1/index.jsp?topic=/com.ibm.lmc.doc/wcwin27.htm). However, it does not transparently handle TCP reset scenarios when switching to a slower network connection due to packet loss and increased round trip times.

A paper from the University of Portsmouth, Portsmouth, UK "A simple implementation to roaming between GPRS and WiFi Networks 1" by M. Adda, J. Saunders and A. Peart, describes a mechanism for roaming data connections between GPRS and WiFi networks. However the solution proposed in the paper requires a hardware device. Furthermore, it does not transparently avoid TCP reset scenarios when switching from fast networks (such as LAN or WiFi) to slower networks (such as 3G), by adapting the TCP flow control window to the new physical network constraints.

The article "Freeze-TCP: A true end-to-end TCP enhancement mechanism for mobile environments" (Tom Goff, James Moronski and D. S. Phatak, IEEE INFOCOM 2000, pp. 1537-1545) is another prior art approach, which relies on the sending side to sense when a disconnection is about to occur (if the signal strength is fading, for example). Sensing must be done on time to allow sending a zero window update that will be received by the sending end. Furthermore, the approach detailed in the article deals with mobile TCP only and cannot handle roaming including wired to wired roaming scenarios. In wired scenarios the communication is abruptly stopped and it is therefore impossible to detect when the client is about to disconnect. Therefore, the receiving end will never be able to send a zero window request.

The problem encountered by the user can be easily illustrated by the following example, with reference to FIG. 1. The user uses a mobile phone to download a file from his desktop PC using FTP (over TCP). In order to have the best network connectivity and in order to save data charges by the mobile operator the user chooses to connect to the home network through a local WiFi access point. The user exits his home and loses his WiFi connection because he is out of its range. The phone automatically connects to the 3G network offered by the cellular network provider. As a result the network interface card is assigned with an IP address provided by the mobile operator network. In such scenarios the file transfer would be stopped and will have to restart from scratch.

As will be appreciated by the skilled person, although the problem is one of importance and attempts have been made in the art to address it, so far the art has failed to provide a comprehensive and convenient method and system to solve this problem, which can be universally implemented and which does not require dedicated appliances and which is totally transparent to applications, including existing applications, and furthermore does not require any modification to the source code or binaries. It is an object of the present invention to provide such a method and system that enables a location free communication layer between devices, which is free of interruption due to roaming.

It is a further object of the invention to provide the system and method which are simple to implement and which do not require the development of applications based on a specific platform.

Other objects and advantages of the invention will become apparent as the description proceeds.

SUMMARY OF THE INVENTION

The invention relates to a system for roaming TCP connections when the physical networks are changed, comprising a Virtual Network Interface Card (NIC) having a unique IP address. IN one embodiment of the invention the TCP connection 4-tuple (source IP, source Port, destination IP, destination port) remains unchanged.

In another embodiment of the invention the Virtual NICs is of the form of TUN/TAP devices.

The invention is also directed to a method for providing substantially continuous service during roaming of TCP connections when the physical networks are changed, comprising providing a kernel level Virtual Network Interface Card (NIC) having a unique IP address and causing applications to establish a connection using the virtual IP address endpoints.

In one embodiment of the invention a first host creates a socket to a second host, while binding to the first host's virtual IP address, and then sends a packet to said second host, comprising the steps of:

1) writing said packet said first host's virtual NIC;
2) sending by said first host's virtual NIC the packet over the appropriate physical network interface card;
3) transmitting the packet over the physical network;
4) receiving the packet by said second host's physical NIC writing it to said second host's virtual NIC; and
5) reading the data by an application.

The invention also encompasses a method of roaming TCP connections comprising the steps of:

1) Detecting that the current physical link is down;
2) Suspending the outgoing traffic;
3) Establishing a new connection; and
4) Resuming outgoing TCP traffic.

In one embodiment outgoing data are effectively paused during network transition periods by generating and sending a synthesized message setting the sliding window size of the TCP protocol to 0.

DETAILED DESCRIPTION OF THE INVENTION

The invention provides an infrastructure that enables applications with a continuous network stream on devices supporting connectivity to multiple networks. The invention enables the user to start an application on one type of network (e.g. WiFi network) and continue its operation using a different type of network (e.g. 3G). When operating according to the invention the network transition is seamless to application and user. Furthermore, the stream of data resumes instantly upon physical connection reestablishment.

The invention provides a generic infrastructure for roaming TCP connections when the physical networks are changed. Furthermore, the invention does not require any modifications to existing applications binaries. Using the infrastructure according to the invention the file transfer described in the above example would continue seamlessly when the user moves from his home to the street.

An additional advantage of the invention is that it transparently avoids TCP reset scenarios when switching from fast networks (such as LAN or WiFi) to slower networks (such as 3G), by adapting the TCP flow control window to the new physical network constraints.

The various stages of the invention will be now discussed in greater detail.

Stage 1—Connection Abstraction

Figure 1:
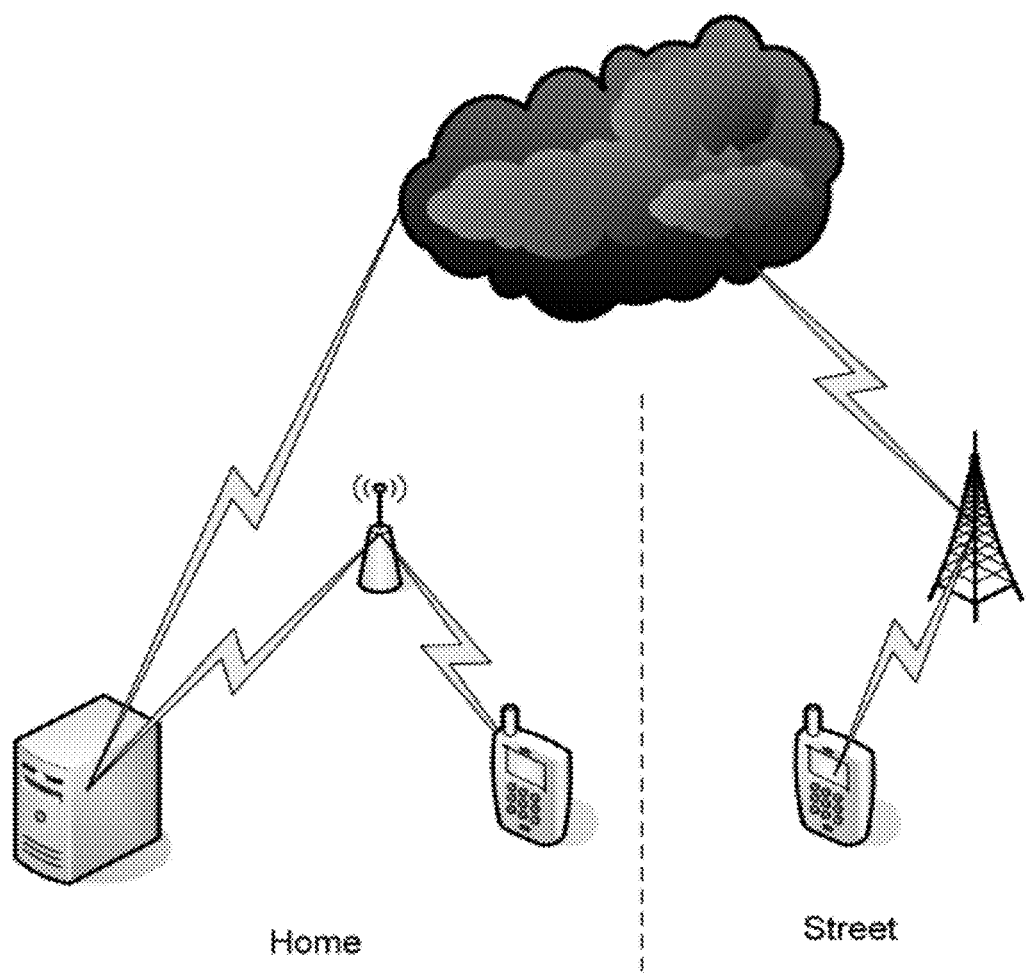
FIG. 1 schematically illustrates the problems existing in prior art systems during roaming.
Figure 2:
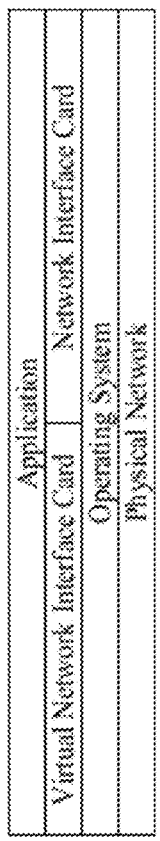
FIG. 2 illustrates the layers which are used by the invention.
Figure 2:
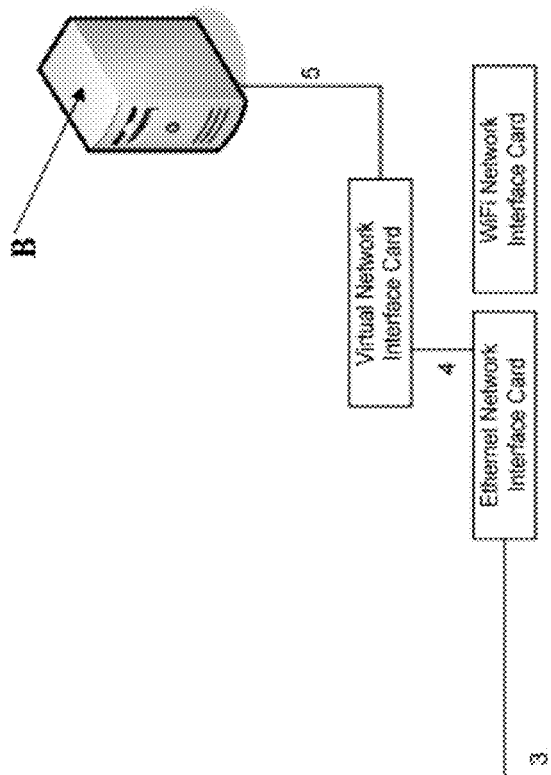

According to the invention a kernel level Virtual Network Interface Card (NIC) is generated, which has a unique IP address. Applications may establish a connection using the virtual IP address endpoints. Using this mechanism the TCP connection 4-tuple (source IP, source Port, destination IP, destination port) remains unchanged. Therefore the application level TCP connection will not break when the underlying physical network changes. This structure is schematically illustrated in FIG. 2.

The Virtual NICs may be of the form of TUN/TAP devices used for VPN tunneling. The virtual NIC reflects a constant IP address of the device. It is the responsibility of the NIC to deliver the data over the physical network (layer 1 according to the OSI network model).

Figure 3:
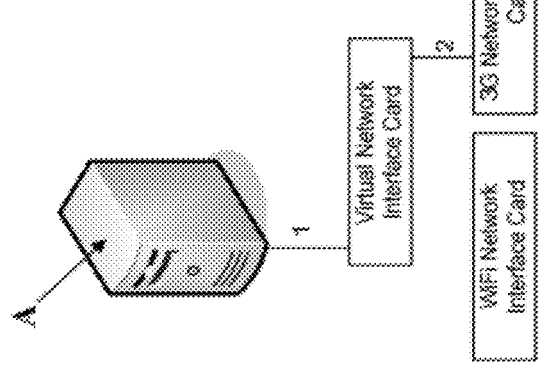
FIG. 3 is an example of the sequence involved in sending a TCP message.

The operation of the invention can be further illustrated by the following example: Host A creates a socket to host B while binding to A's virtual IP address. It then sends a packet to host B. The packet's source address is A's virtual address, for example 10.0.0.1. The packet's destination address is B's virtual address, for example 10.0.0.2. FIG. 3 shows the sequence of sending a TCP message, which involves the following steps:

1. The packet is written to A's virtual NIC;
2. A's virtual NIC sends the packet over the appropriate physical network interface card;
3. The packet is transmitted over the physical network;
4. B's physical NIC receives the packet and writes it to B's virtual NIC; and
5. The Data is read by the application.

The process is transparent to the application. Any networked application using the virtual NIC address space can therefore enjoy the seamless TCP roaming capability.

Stage 2—Roaming an Existing TCP Connection

Roaming TCP connections consist of the following steps:
1. Detecting that the current physical link is down;
2. Suspending the outgoing traffic;
3. Establishing a new connection; and
4. Resuming outgoing TCP traffic.

Detecting that the physical link is down may be accomplished by registering to the operating system's callback methods that provides notifications when the current communication channel state is changed.

TCP is a reliable protocol. Every byte that is sent is numbered and acknowledged by the receiving end. TCP also provides a network flow control mechanism in the form of a sliding window. A window size value of 0 indicates to the sending end that the receiver is not ready to receive any data. The sending end stops sending data until the receiving end changes the sliding window size to a value greater than 0.

In one embodiment of the invention the sliding window feature is used in order to effectively "pause" outgoing data during network transition periods. In this embodiment of the invention when a TCP protocol packet is read by the virtual NIC during a network change period the driver sends a synthesized message setting the window size to 0.

Once a new connection is established the virtual NIC sends the initial window size to the paused connections.

Figure 4:
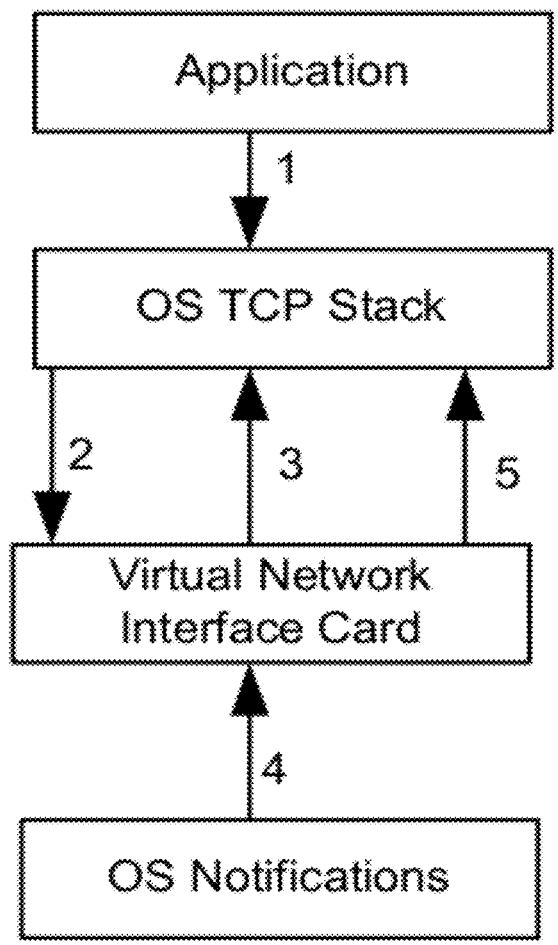
FIG. 4 schematically illustrates the sequence flow during network transition.

The sequence flow during network transitions is schematically illustrated in FIG. 4. The sequence is as follows:
1. The application sends a TCP packet to the remote device;
2. The Operating System forwards the packet to the virtual NIC for delivery;
3. The Virtual NIC is aware that the current physical network is unavailable and synthesizes a TCP control message setting the connection's window size to 0;
4. The OS notifies the virtual NIC (via callbacks) that a new physical connection is available; and
5. The virtual NIC sends a synthesized TCP control packet setting the window size to its initial size of the medium.

Symmetrically, the remote endpoint follows the same sequence in order to stop sending packets. Detection of the broken link may be achieved using a presence server or a keep-alive mechanism.

The invention avoids the standard pitfalls of TCP retransmission timeouts that may delay data transfer when the physical connection is restored. When operating according to the invention the data transmission continues as soon as the physical connection is reestablished. The user is therefore able to have an almost continuous streaming application while roaming between different network infrastructures (Wired, WiFi, 3G etc.)

Roaming TCP Connections to Public IP Addresses

In addition to the advantages described above, the invention further enables TCP connection roaming to remote endpoints that are not running the virtual NIC driver, like public servers on the internet, via means of a physical-to-virtual gateway device. Public servers, not running the virtual NIC driver, are able to establish connections with the physical IP addresses. Thus the connection 4-tuple changes when the client endpoint IP address changes (due to a network switch) resulting in a connection break. In case of remote public server endpoint one embodiment of the invention uses a third device, running the virtual NIC, acting as a gateway between the client and the public server. When the client's virtual NIC reads a packet that is destined to an address outside its virtual address space forwards it to a gateway device. The gateway device establishes a connection with the public server and relays the data from the client to the server and vice versa. The connection between the public server and the gateway device is transparent to the client device network switch and, therefore, the connection with the public server does not break.

Figure 5:
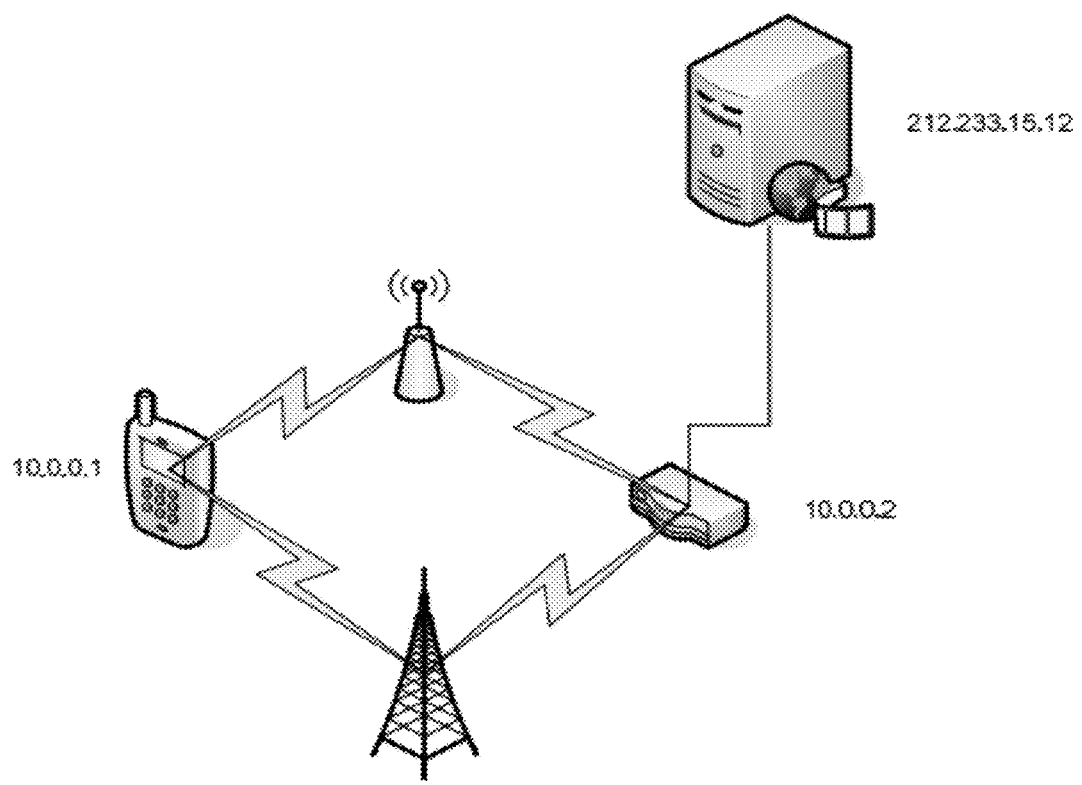
FIG. 5 summarizes the sequences involved in roaming TCP connections to public IP addresses.

The sequence described above is illustrated in FIG. 5. As seen in the figure, in this specific example a mobile phone connects to a server on the internet that streams video. It sends a TCP SYN packet from 10.0.0.1 to 212.233.15.12. The virtual NIC forwards the packet to virtual address 10.0.0.2 which it, in turn, establishes a connection with 212.233.15.12. This sequence will be repeated for every packet sent on the connection. The TCP connection between the mobile device and the gateway device is a virtual NIC to virtual NIC connection and supports cross-network roaming.

Additional illustrative advantages of the invention are as follows:
1. The invention overcomes noisy network environments where the physical connection is broken for short periods of time. This is very typical in 3G networks.
2. The invention allows choosing the best physical network and roaming alternatives while optimizing the price and bandwidth alternatives without losing connectivity. For example, the system may use a 3G network over WiFi because the 3G network may provide a better bandwidth.
3. The invention permits to use the seamless roaming infrastructure as a proxy to servers that do not have the virtual NIC installed, as described above with reference to Roaming TCP connections to public IP addresses.
4. The invention permits using the gateway functionality as an anonymity mechanism. The public server is not aware of the client ID it is servicing (like in the TOR project—http://www.torproject.org/).

All the above description and examples have been provided for the purpose of illustration and are not intended to limit the invention in any way. The skilled person will easily appreciate that the invention can be implemented in many different ways, to provide roaming solutions in a variety of scenarios. In fact, the invention encompasses each and every system and method exploiting one or more virtual NICs to prevent connection breakage during roaming.

The invention claimed is:

1. A system for roaming Transmission Control Protocol (TCP) connections when physical networks are changed, comprising:
   (a) a first host device comprising a virtual Network Interface Card (NIC) having a unique Internet Protocol (IP) address;
   (b) a second host device between which said first host device a TCP connection is able to be established using address endpoints of the virtual IP; and
   (c) a physical-to-virtual gateway device with a corresponding virtual NIC having a unique IP address, wherein the virtual NIC of said gateway device is operable to set a sliding window size of said first host device to 0 during network transition periods of said first host device, causing outgoing TCP data to be effectively paused, and to set said sliding window to its initial size when a new physical network connection for said first host device is established,
   wherein said gateway device is operable to notify at least said second host device that said TCP connection has not been terminated during said network transition periods and that the outgoing TCP data is transmittable after establishing a new physical network connection for said first host device.

2. The system according to claim 1, wherein the TCP connection 4-tuple (source IP, source Port, destination IP, destination port) remains unchanged after the new physical network connection for the first host device has been established.

3. The system according to claim 1, wherein the virtual NICs are of the form of TUN/TAP devices.

4. A method for providing substantially continuous service between a first host device and a second host device during roaming of TCP connections when physical networks are changed, comprising:
   (a) providing said first host device with a virtual Network Interface Card (NIC) having a unique IP address;
   (b) providing a physical-to-virtual gateway device with a corresponding virtual NIC having a unique IP address;
   (c) establishing a virtual NIC to virtual NIC connection between said first host device and said gateway device upon transmitting an unmodified data packet from said first host device to an address outside its virtual address;
   (d) establishing a TCP connection between said first host device and said second host device using address endpoints of the virtual IP by establishing a connection between said gateway device and said second host, in order to transmit said data packet to said second host;
   (e) causing outgoing TCP data to be effectively paused during network transition periods of said first host device by generating and transmitting a synthesized message from the virtual NIC of said gateway device to said first host device for setting a sliding window size of the TCP protocol thereof to 0;
(f) notifying by said gateway device to at least said second host device that said TCP connection has not been terminated;
(g) establishing a new physical network connection for said first host device by the virtual NIC of said gateway device;
(h) notifying by said gateway device to at least said second host device that said outgoing TCP data is now transmittable; and
(i) transmitting another synthesized message by the virtual NIC of said gateway device to said first host device for setting said sliding window to its initial size and resuming transmission of said outgoing TCP data without establishing another session.

5. The method according to claim 4, wherein the first host device creates a socket to the second host device, while binding to the first host device's virtual IP address, and then sends a packet to the second host device, comprising the steps of:
(a) writing the packet to said first host device's virtual NIC;
(b) sending the packet by the first host device's virtual NIC over the appropriate physical network interface card;
(c) transmitting the packet over the physical network;
(d) receiving said packet by a physical NIC of the second host device's physical NIC;
(e) writing said packet to a virtual NIC of the second host device; and
(f) reading the data by an application.

6. The method according to claim 4, for use in noisy network environments where the physical connection is broken for short periods of time.

7. The method according to claim 4, comprising choosing the best physical network and roaming alternatives while optimizing the price and bandwidth alternatives without losing connectivity.

8. The system according to claim 1, wherein the gateway device is used as a proxy to servers in which the virtual NIC is not installed.

9. The method according to claim 4, wherein the second host device is a public server.

10. The method according to claim 4, wherein a connection is also established between the gateway device and the second host device in order to transmit another data packet from the second host device to the first host device.

11. The method according to claim 9, wherein the gateway device is used as an anonymity mechanism such that the public server is not aware of an identification of the first host device.

12. The method according to claim 4, wherein the second host device is a device at which an application resides.

* * * * *